(12) United States Patent
Sawai et al.

(10) Patent No.: US 8,100,212 B2
(45) Date of Patent: Jan. 24, 2012

(54) TRACTOR

(75) Inventors: Megumi Sawai, Izumi (JP); Yutaka Inubushi, Sakai (JP)

(73) Assignee: Kubota Corporation, Osaka (JP)

( * ) Notice: Subject to any disclaimer, the term of this patent is extended or adjusted under 35 U.S.C. 154(b) by 573 days.

(21) Appl. No.: 12/243,528

(22) Filed: Oct. 1, 2008

(65) Prior Publication Data

US 2009/0236876 A1  Sep. 24, 2009

(30) Foreign Application Priority Data

Mar. 24, 2008  (JP) .................................. 2008-075964
Mar. 26, 2008  (JP) .................................. 2008-081202

(51) Int. Cl.
*B62D 25/12* (2006.01)

(52) U.S. Cl. .................................... 180/69.2; 180/69.21

(58) Field of Classification Search ............ 16/362–364, 16/366, 371; 180/69.2, 69.21; 296/193.11
See application file for complete search history.

(56) References Cited

U.S. PATENT DOCUMENTS

| | | | | |
|---|---|---|---|---|
| 3,789,945 A * | 2/1974 | Hansen | ......................... | 180/69.2 |
| 4,125,170 A * | 11/1978 | Botz | ............................ | 180/69.21 |
| 4,418,377 A * | 11/1983 | Tamura | ............................ | 362/19 |
| 4,669,564 A * | 6/1987 | Kreutz | ........................ | 180/89.12 |
| 4,836,738 A * | 6/1989 | Nozaka et al. | .................. | 414/607 |
| 5,048,154 A * | 9/1991 | Swartzendruber | .............. | 16/267 |
| 5,136,752 A * | 8/1992 | Bening et al. | .................... | 16/287 |
| 5,209,314 A * | 5/1993 | Nishiyama | .................... | 180/68.6 |
| 5,803,198 A * | 9/1998 | Baxter et al. | ................ | 180/69.21 |
| 6,003,204 A * | 12/1999 | Roach et al. | ..................... | 16/267 |
| 6,030,029 A * | 2/2000 | Tsuda et al. | ............. | 296/203.02 |
| 6,035,848 A * | 3/2000 | Ray et al. | ........................ | 126/194 |
| 6,082,477 A * | 7/2000 | Murakawa | .................. | 180/69.21 |
| 6,167,977 B1 * | 1/2001 | Adamson et al. | ............ | 180/69.2 |
| 6,494,526 B2 * | 12/2002 | Uno | .......................... | 296/190.08 |
| 6,789,293 B2 * | 9/2004 | Habegger et al. | ............... | 16/343 |
| 7,219,608 B2 * | 5/2007 | Sung | ........................... | 108/50.11 |
| 7,464,782 B2 * | 12/2008 | Hirakawa et al. | .......... | 180/89.12 |
| 7,475,750 B2 * | 1/2009 | Tokuhara | ...................... | 180/69.2 |
| 7,735,594 B2 * | 6/2010 | Hidaka | .......................... | 180/312 |
| 7,856,696 B2 * | 12/2010 | Huck | ............................... | 16/366 |
| 7,909,125 B1 * | 3/2011 | Keen | .......................... | 180/69.21 |

FOREIGN PATENT DOCUMENTS

| | | |
|---|---|---|
| JP | 53072317 U1 | 6/1978 |
| JP | 2076526 U1 | 6/1990 |
| JP | 5046535 U1 | 6/1993 |
| JP | 2002012061 A | 1/2002 |
| JP | 2002059761 A | 2/2002 |
| JP | 2002240577 | 8/2002 |
| JP | 2003002239 | 1/2003 |

* cited by examiner

*Primary Examiner* — J. Allen Shriver, II
*Assistant Examiner* — Travis Coolman
(74) *Attorney, Agent, or Firm* — The Webb Law Firm

(57) ABSTRACT

Provided are a vehicle body frame, a support frame that is erected on the vehicle body frame and that supports a hood, a steering wheel, a steering column that is erected on the vehicle body frame and that supports the steering wheel, an instrument panel, an operation panel that is provided below the steering wheel and that has a display window at a position facing the instrument panel, and a connecting member connected at one end to the support frame and connected at the other end to the steering column; wherein the instrument panel is mounted on the connecting member.

7 Claims, 14 Drawing Sheets

TRACTOR

BACKGROUND OF THE INVENTION

1. Field of the Invention

The present invention relates to a tractor comprising an operation panel and an instrument panel provided below a steering wheel.

2. Description of the Related Art

The tractor disclosed in, e.g., Japanese Laid-open Patent Application No. 2003-2239 (see paragraphs [0014], [0015], FIGS. 1 and 3) is a conventional example of the tractor described above. This tractor comprises a control handle (equivalent to a steering wheel), a first cover (equivalent to an operation panel), and an instrument part (equivalent to an instrument panel).

With this type of tractor, sometimes the operation panel is removed and inspections and repairs are performed on the various apparatuses and devices located on the inside of the operation panel. If the instrument panel is supported on the operation panel in this case, cords and cables are linked to the operation panel via the instrument panel, and troublesome labor is therefore required for removing the instrument panel from the operation panel or for disconnecting the cords and cables so that the operation panel can be removed.

An object of the present invention is to provide a tractor in which the operation panel can be removed in a simple operation, and in which the structure can be achieved in a simple manner.

SUMMARY OF THE INVENTION

The tractor according to the present invention comprises a vehicle body frame, a support frame that is erected on the vehicle body frame and that supports a hood, a steering wheel, a steering column that is erected on the vehicle body frame and that supports the steering wheel, an instrument panel, an operation panel that is provided below the steering wheel and that has a display window at a position facing the instrument panel, and a connecting member connected at one end to the support frame and connected at the other end to the steering column; wherein the instrument panel is mounted on the connecting member.

According to this configuration, the instrument panel can be supported on instrument panel support parts of the connecting member and can be left on the vehicle body, and the operation panel can be removed from the support frame independently of the instrument panel.

The support frame and the steering column can be reinforced by the connection with the connecting member, and the connecting member can be used as support means to support the instrument panel so as to keep the instrument panel on the vehicle body.

Therefore, the operation panel can be removed by a simple operation and inspections and repairs can be performed efficiently without the need for labor for separating the instrument panel and the operation panel, or labor for disconnecting cords or cables for the instrument panel. Moreover, it is possible to obtain at low cost a simple structure that uses a connecting member for reinforcing the support frame and the steering column as support means for supporting the instrument panel.

In the configuration described above, it is preferable that the connecting member be provided with a panel support part for fastening and connecting the part of the operation panel in the vicinity of the display window.

According to this configuration, the part of the operation panel in the vicinity of the display window can be pressed against the instrument panel to satisfactorily create a seal between the operation panel and the instrument panel, by fastening the part of the operation panel in the vicinity of the display window to the panel support part.

Therefore, the instrument panel is supported on the connecting member so as to allow the operation panel to be removed independently, and a seal can be satisfactorily created between the operation panel and the instrument panel to prevent water infiltration or the like.

In the configuration described above, it is preferable that the display surface of the instrument panel have a curved surface in which the center in the vertical direction of the instrument panel is concaved inward as seen from the side of the vehicle body.

According to this configuration, the orientation or other characteristics of reflected light can be adjusted by the curvature of the display surface so that the notations are not obscured by the reflected light. Therefore, the display is easily visible, and the display can be observed accurately.

The tractor according to the present invention comprises a hood capable of swinging up and down between a raised open position and a lowered closed position, hood support bodies, pivoting pins provided to either one of the hood or the hood support bodies, pivoting-pin holes provided to the other one of the hood or the hood support bodies, support pins provided to the hood, support pin holes that are provided to the hood support bodies and that have openings for engaging and releasing the support pins, and openings that are formed in the pivoting-pin holes and that engage and release the pivoting pins; wherein the support pins are engaged with the support pin holes in the raised open position, thereby preventing the pivoting pins from detaching from the pivoting-pin holes, and the engagement between the support pins and the support pin holes is released in the lowered closed position, thereby allowing the pivoting pins to detach from the pivoting-pin holes.

According to this configuration, if the hood is lowered below the raised open position, the support pins detach from the support pin holes, the hood support means switch to the operation-released state, and the pivoting pins are detached from the pivoting-pin holes, thereby releasing the pivot support provided to the hood by the pivoting pins and the pivoting-pin holes, and allowing the hood to be removed. When the hood is brought to the raised open position, the support pins fit into the support pin holes, the hood support means switch to the operating state, and the hood is supported in the raised open position.

Therefore, while the hood is pivotably supported to freely swing vertically open and closed, and also while the open hood can be stably supported by the hood support means during inspections and repairs, the pivoting pins can be taken out of and removed from the pivoting-pin holes merely by lowering the hood below the raised open position in order to remove the hood, and the hood can be removed in an easily operable manner without the need for a special operation for releasing the pivot locking.

In the configuration described above, it is preferable that the tractor comprise guides that are provided to be continuous with the openings of the support pin holes and that guide the engaging and disengaging of the support pins.

According to this configuration, the support pins can be smoothly engaged with and disengaged from the support pin holes.

In the configuration described above, it is preferable that urging members be provided for urging the hood to swing to the raised open position.

According to this configuration, when the hood is being opened, the swingable urging of the urging members can be used to gently open the hood.

When urging means are used in a configuration comprising the openings provided to the pivoting-pin holes, the upward urging of the hood by the urging means causes wobbling to readily occur in the pivot support provided to the hood by the pivoting pins and the pivoting-pin holes. However, the hood, having been brought to the raised open position, is stably supported by the hood support means, which has switched to the operating state, and wobbling caused by the urging means does not readily occur.

Therefore, while the hood can be removed in an easily operable manner merely by separating the pivoting pins and the pivoting-pin holes, and also while the swingable urging of the urging means can be used to gently open the hood, the open hood can be stably supported by the hood support means.

KEY

Figure 1:
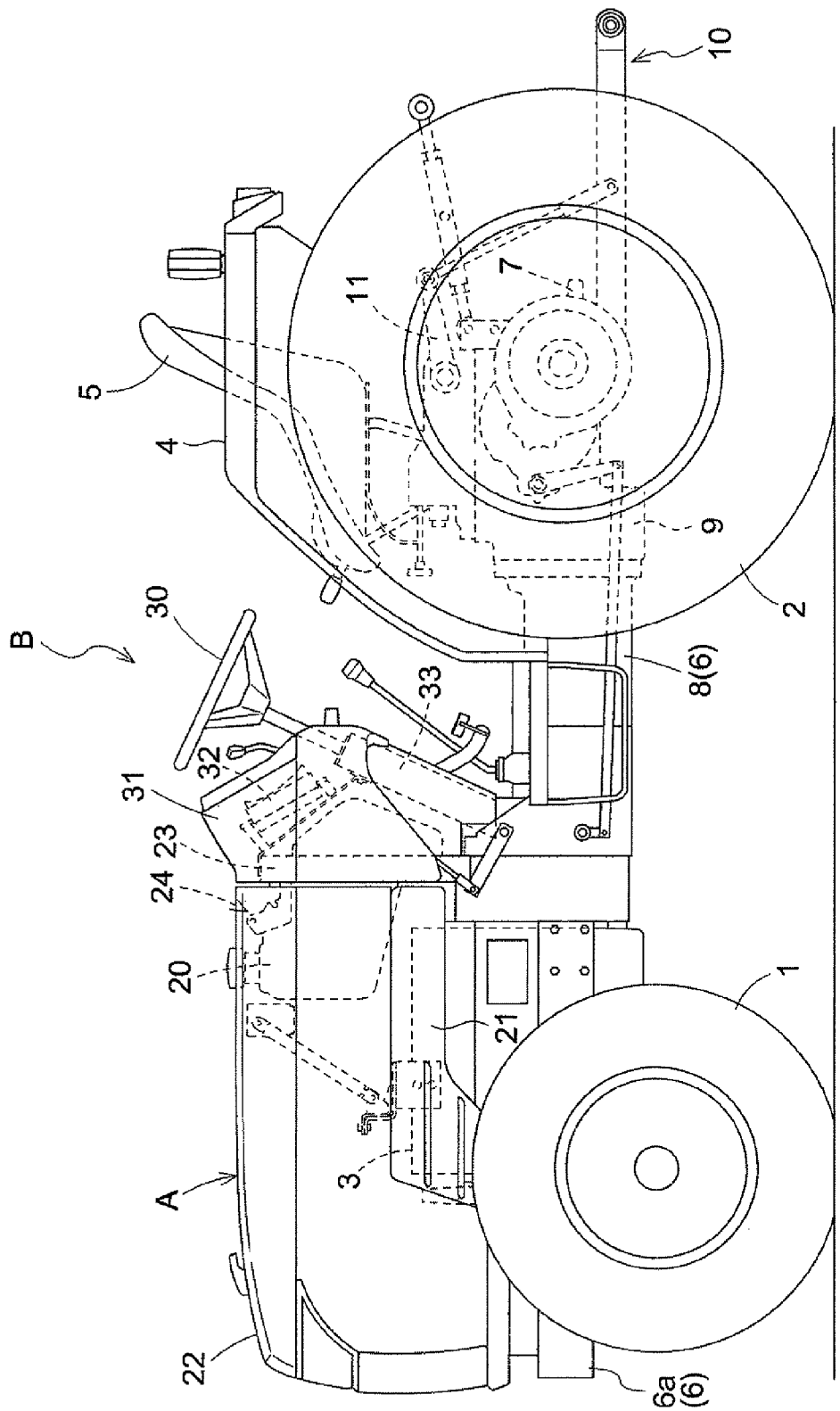
FIG. 1 is an overall side view of the tractor.

6: Vehicle body frame
22, 11: Hood
23: Support frame
30: Steering wheel
31: Operation panel
32: Instrument panel
32a: Display surface of instrument panel
33: Steering column
34: Connecting member
34c: Instrument panel support part
34d: Panel support member
40: Display window
112: Urging means 112
121: Pivoting-pin hole
122: Hood support body
123: pivot pins 130: Hood support means
131: Support pin
132: Support-pin hole
133: Opening

DESCRIPTION OF THE PREFERRED EMBODIMENTS

Embodiments of the present invention are described hereinbelow with reference to the drawings.

Figure 2:
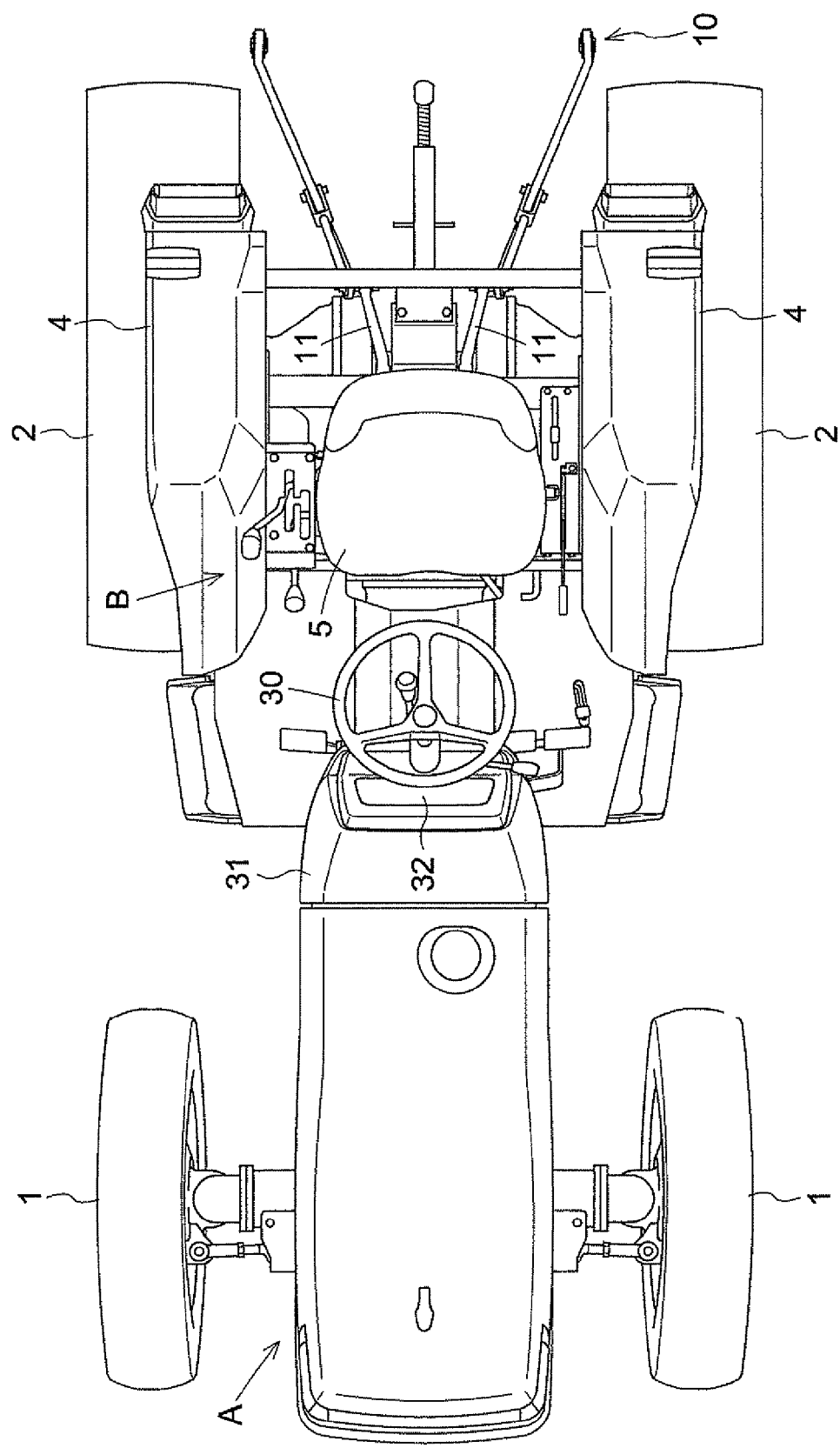
FIG. 2 is an overall plan view of the tractor.

FIG. 1 is an overall side view of the tractor according to an embodiment of the present invention. FIG. 2 is an overall plan view of the tractor according to an embodiment of the present invention. In the tractor according to the embodiment of the present invention, a self-propelled vehicle is configured comprising a pair of left and right steerable and drivable front wheels 1, 1, a pair of left and right drivable rear wheels 2, 2, a power plant A that is provided at the front of the vehicle body and that has an engine 3, and an operation part B that is provided at the rear of the vehicle body between a pair of left and right rear wheel fenders 4, 4 and that has an operation seat 5; wherein the tractor is configured comprising a link mechanism 10 having a pair of left and right lift arms 11, 11, and a power take-off shaft 7 at the rear of a vehicle body frame 6 of the self-propelled vehicle, as shown in the drawings.

The tractor is configured so that a rotary tiller (not shown) is connected to the rear part of the vehicle body via the link mechanism 10 and the output of the engine 3 is transmitted from the power take-off shaft 7 to the rotary tiller, constituting a riding-type cultivator. Thus, with this tractor, various implements are drivably connected to the rear part of the vehicle body, constituting various riding-type work machines.

The vehicle body frame 6 is configured comprising a power transmission case 8 connected to the rear part of the engine 3, a transmission case 9 connected to the rear part of the power transmission case 8, and a front wheel support frame 6a connected to the bottom part of the engine 3, as shown in FIG. 1.

Figure 3:
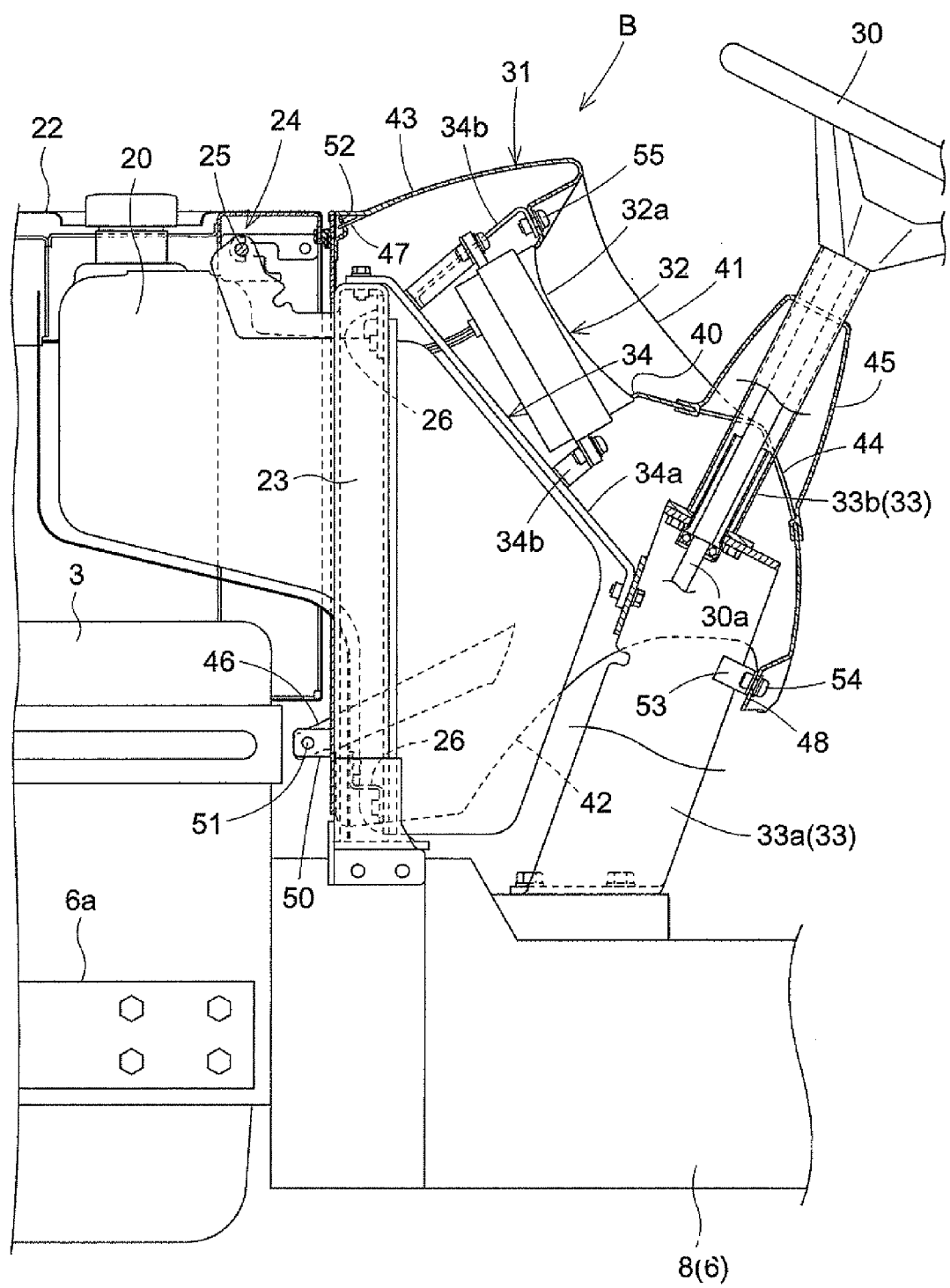
FIG. 3 is a side view of the power plant and the operation part.

In addition to comprising the engine 3, the power plant A also comprises a fuel tank 20 for the engine, the fuel tank being disposed above the rear part of the engine 3, lateral side plates 21 positioned on the lateral sides of the bottom part of the engine 3, and a single hood 22 positioned extending forward from above the pair of left and right lateral side plates 21, 21, as shown in FIGS. 1 and 3.

Figure 4:
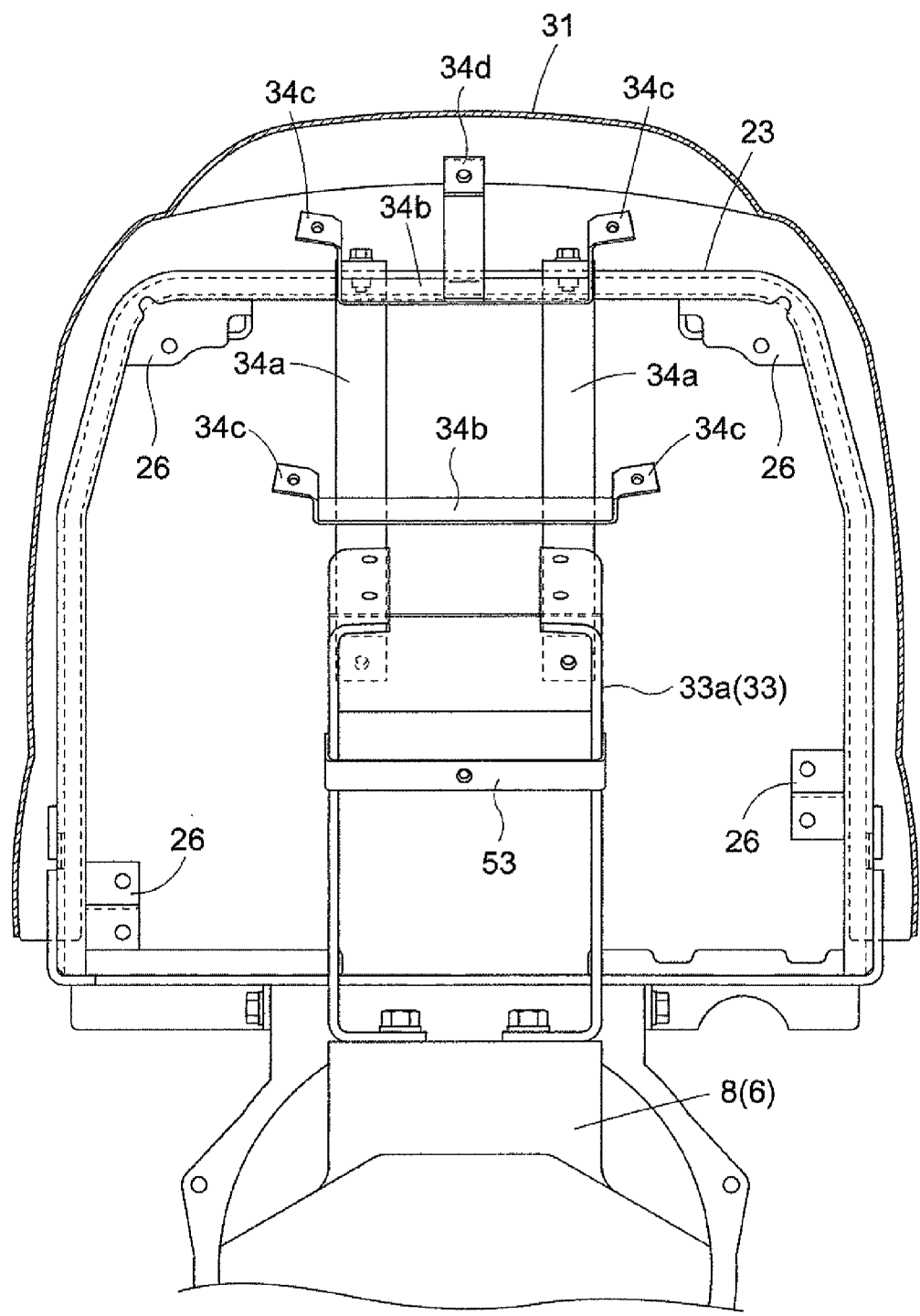
FIG. 4 is a rear view of the connecting member.
Figure 7:
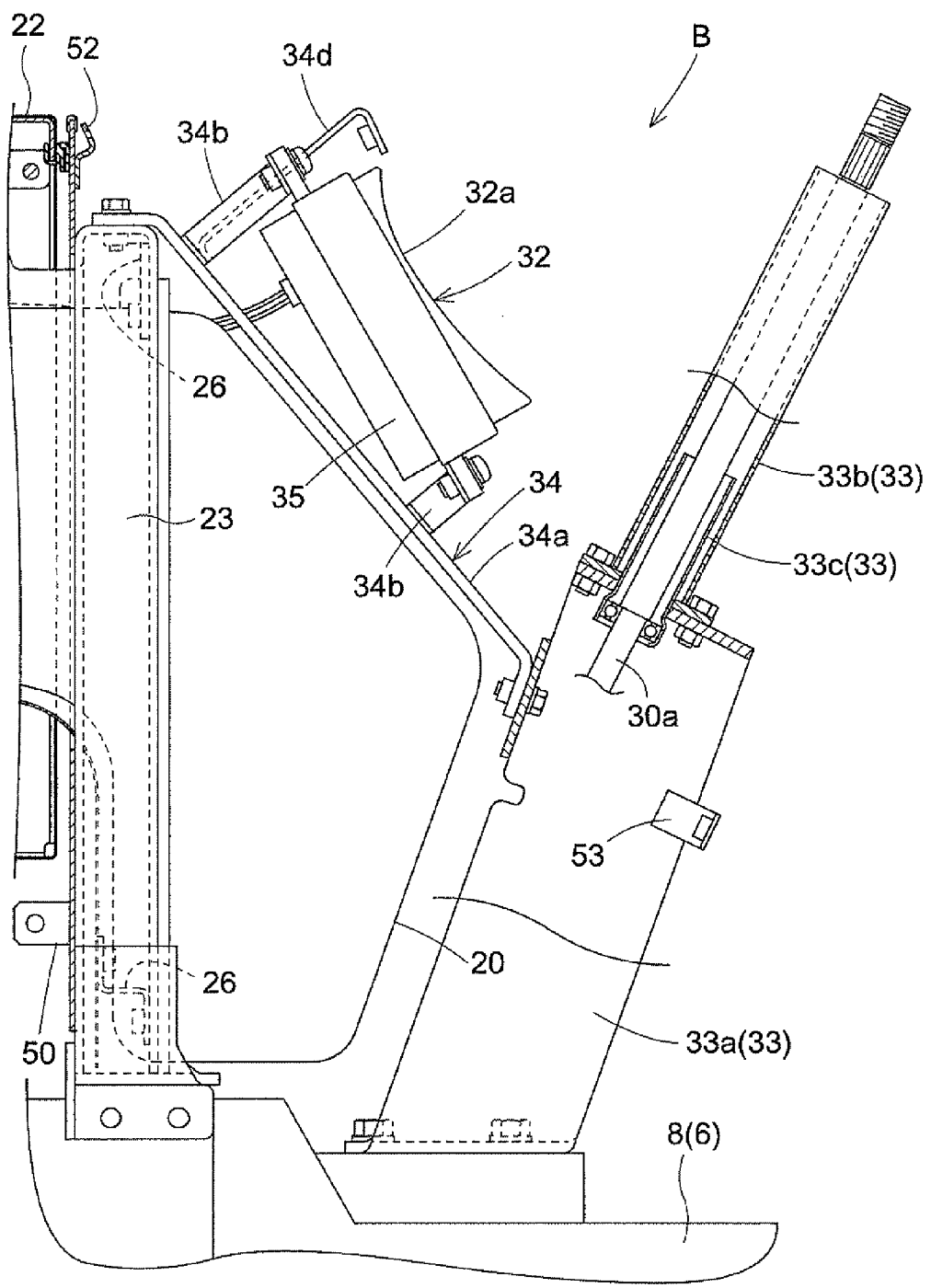
FIG. 7 is a side view of the operation part as having the operation panel removed.

The pair of left and right lateral side plates 21, 21 and the hood 22 form an engine compartment above the front wheel support frame 6a. The hood 22 is supported on a support frame 23 that is erected on the vehicle body frame 6 and that has a gate shape as seen in the longitudinal direction of the vehicle body, via a pair of left and right pivot mechanisms 24, 24 provided extending between the support frame 23 and the rear end part of the hood 22, as shown in FIGS. 4 and 7.

In other words, the hood 22 vertically swings open and closed around axial centers of pivoting pins 25 provided to the pair of left and right pivot mechanisms 24, 24, thus opening and closing the engine compartment.

The fuel tank 20 is supported on the support frame 23 via stays 26 (see FIG. 4) provided to the support frame 23 and dispersed around the periphery of the fuel tank 20.

In addition to comprising the operation seat 5, the operation part B comprises a steering wheel 30 provided in front of the operation seat 5, and an operation panel 31 and instrument panel 32 provided below the steering wheel 30, as shown in FIGS. 1 and 2.

Figure 5:
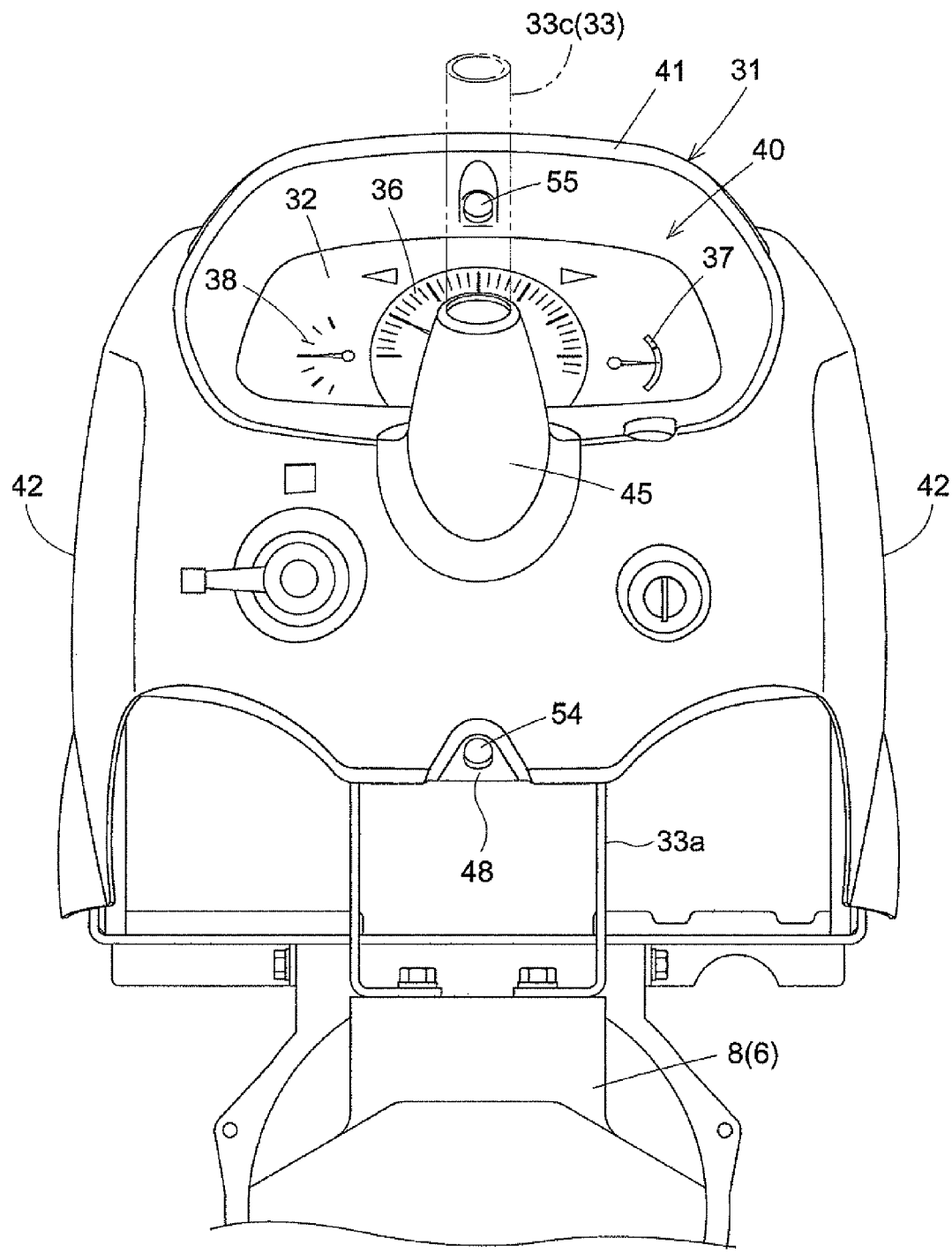
FIG. 5 is a rear view of the part of the operation part in which the operation panel is installed.
Figure 6:
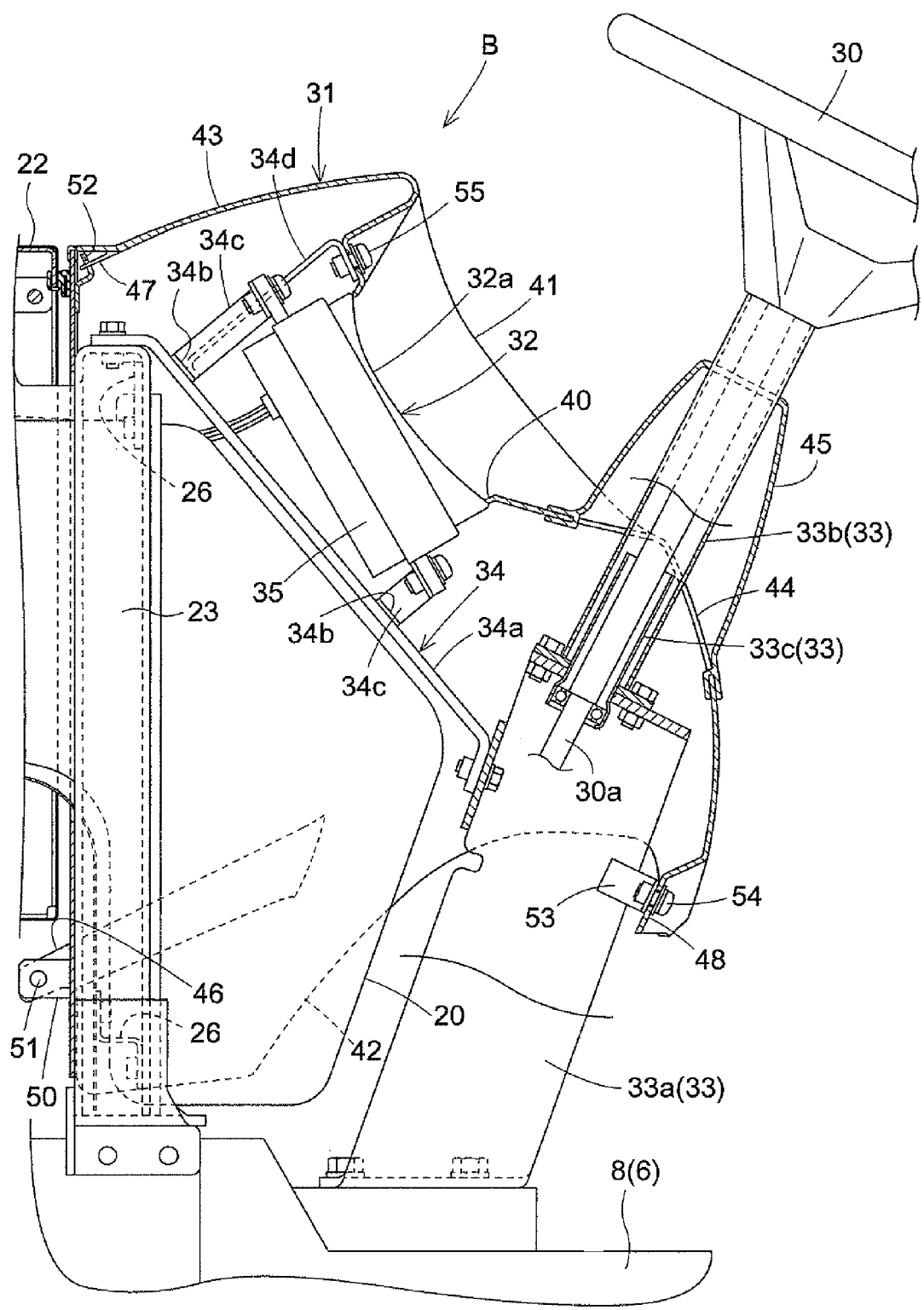
FIG. 6 is a side view of the operation part as having the operation panel attached.

FIG. 5 is a rear view of the part of the operation part B where the operation panel is installed. FIG. 6 is a side view of the part of the operation part B where operation panel is installed. The steering wheel 30 is rotatably supported via a handle shaft 30a on a steering column 33 erected farther to the rear of the vehicle body than the support frame 23 on the power transmission case 8 which constitutes the vehicle body frame 6, as shown in the drawings.

The steering column 33 is configured comprising a column proximal part 33a composed of sheet metal to which the bottom end of the power transmission case 8 is connected, and a column distal end part 33b composed of a cylinder extending toward the top of the vehicle body from the top end of the column proximal part 33a. The column proximal part 33a comprises a cylinder shaft part 33c into which the handle shaft 30a is fitted.

The support frame 23 and the steering column 33 are connected by a connecting member 34 provided on the inside of the operation panel 31 and are reinforced so as to increase support strength.

FIG. 4 is a rear view of the connecting member 34. The connecting member 34 is configured comprising connecting member main bodies 34a, 34a composed of a pair of left and right band plates for connecting the top end of the support frame 23 and the top end of the column proximal part 33a of the steering column 33, and a pair of connecting rods 34b, 34b oriented in the transverse direction of the vehicle body for connecting the pair of left and right connecting member main bodies 34a, 34a at both ends, as shown in FIGS. 4 and 6.

The instrument panel 32 is disposed on the inside of the operation panel 31 in a state in which a display surface 32a of the instrument panel faces backward and upward in relation to the vehicle body, and the instrument panel 32 is supported on instrument panel support parts 34c provided at the ends of the pair of connecting rods 34b, 34b of the connecting member 34, as shown in FIG. 6.

The instrument panel 32 comprises an instrument case 35 having the display surface 32a, an engine tachometer 36 supported in the middle of the instrument case 35 in the transverse direction of the vehicle body, a temperature gauge 37 supported on the instrument case 35 farther out toward one end than the engine tachometer 36, and a fuel gauge 38 supported on the instrument case 35 farther out toward the other end than the engine tachometer 36, as shown in FIGS. 5 and 6. The engine tachometer 36 displays the rotational speed of the engine 3. The temperature gauge 37 displays the temperature of the engine-cooling water. The fuel gauge 38 displays the remaining amount of fuel in the fuel tank 20.

The display surface 32a of the instrument panel 32 is configured by a transparent plate formed so as to have a curved shape, and is a curved surface whose center is concave in the direction from top to bottom of the instrument panel as viewed from the side of the vehicle body, wherein the orientation of reflected light is adjusted so that the visibility of the display is not impeded by reflected light, as shown in FIG. 6.

The operation panel 31 is configured comprising an operation plate part 41 having a display window 40, a pair of left and right lateral side plate parts 42, 42, and a top plate part 43. The operation panel 31 is made of a resin and is made by integrally forming the operation plate part 41, the lateral side plate parts 42, and the top plate part 43 by molding a resin material. The display window 40 is made of a through-hole in the operation plate part 41. The operation plate part 41 comprises a steering hole 44 through which is inserted the column distal end part 33b of the steering column 33, and a cylindrical cover 45 for covering the column distal end part 33b.

The operation panel 31 is detachably supported on the support frame 23 and the steering column 33 in an assembly in which the display window 40 faces the display surface 32a of the instrument panel 32.

Specifically, the operation panel 31 comprises connecting pieces 46 provided at the bottom parts of the front ends of the lateral side plate parts 42, a connecting hole 47 provided at the front end of the top plate part 43, and a connecting part 48 provided at the bottom end part of the operation plate part 41.

The connecting pieces 46 of the lateral side plate parts 42 are disengageably engaged by means of connecting pins 51 with support pieces 50 provided to the support frame 23. The connecting pins 51 are formed integrally on the connecting pieces 46.

The front end of the top plate part 43 is disengageably engaged by means of the connecting hole 47 with a support arm 52 provided on the support frame 23.

The connecting part 48 of the operation plate part 41 is detachably connected by means of a connecting screw 54 to a support plate 53 provided to the column proximal part 33a of the steering column 33.

The part of the operation panel 31 in the vicinity of the upper side of the display window 40 is fastened and connected by means of a connecting screw 55 to a panel support part 34d provided by erecting a plate member on a connecting rod 34b of the connecting member 34, and a seal is created between the operation panel 31 and the instrument panel 32 in the part of the operation panel 31 in the vicinity of the display window 40.

FIG. 6 is a side view of the operation part B as having the operation panel attached. FIG. 7 is a side view of the operation part B as having the operation panel removed. The connecting hole 47 is locked with the support arm 52 of the support frame 23, the pair of left and right connecting pieces 46, 46 are engaged with the support pieces 50 of the support frame 23 by means of the connecting pins 51, the connecting part 48 is connected to the support plate 53 of the steering column 33 by means of the connecting screw 54, and the part in the vicinity of the display window is connected to the panel support part 34d of the connecting member 34 by means of the connecting screw 55, whereby the operation panel 31 is put into a predetermined state of attachment, as shown in the drawings.

The operation panel 31 can be removed by releasing the lock of the connecting hole 47 on the support arm 52, releasing the engagement of the pair of left and right connecting pieces 46, 46 on the support pieces 50 by the connecting pins 51, releasing the connection of the connecting part 48 on the support plate 53 by the connecting screw 54, and releasing the connection of the part in the vicinity of the display window on the panel support part 34d by the connecting screw 55. Even if the operation panel 31 is removed, the instrument panel 32 will still be supported on the instrument panel support parts 34c of the connecting member 34 and will remain on the vehicle body in a predetermined state of attachment.

Other Embodiments

Other embodiments of the present invention are described hereinbelow with reference to the drawings.

Figure 8:
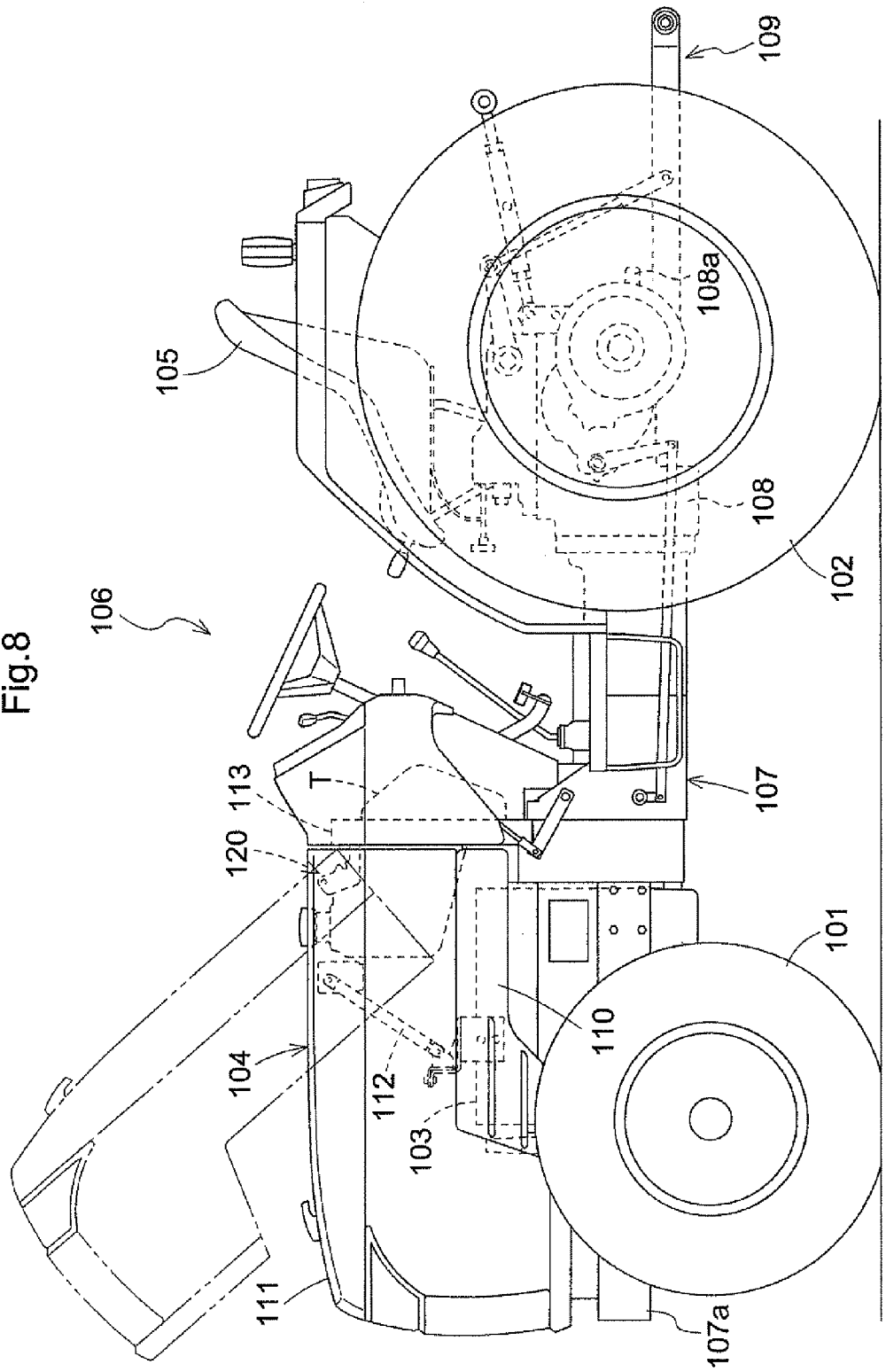
FIG. 8 is an overall side view of a tractor according to another embodiment.

FIG. 8 is an overall side view of a work machine according to an embodiment of the present invention. The work machine according to the embodiment of the present invention constitutes a self-propelled vehicle comprising a pair of left and right steerable and drivable front wheels 101, 101, a pair of left and right drivable rear wheels 102, 102, a power plant 104 that is provided at the front of the vehicle body and that has an engine 103, and an operation part 106 that is provided at the rear of the vehicle body and that has an operation seat 105; wherein the rear of the vehicle body of the self-propelled vehicle is provided with a link mechanism 109 supported in a vertically swingable manner on a transmission case 108 constituting the rear part of a vehicle body frame 107, and a power take-off shaft 108a protruding toward the rear of the vehicle body from the transmission case 108, as shown in the drawing.

This work machine constitutes various riding-type work machines in which various implements are drivably connected to the rear part of a vehicle body in a manner that allows the implements to be raised and lowered, such as a riding-type cultivator configured so that a rotary tiller (not shown) is raisably and lowerably connected to the rear part of the vehicle body of the self-propelled vehicle via the link mechanism 109, and the output of the engine 103 is transmitted from the power take-off shaft 108a to the rotary tiller.

Figure 9:
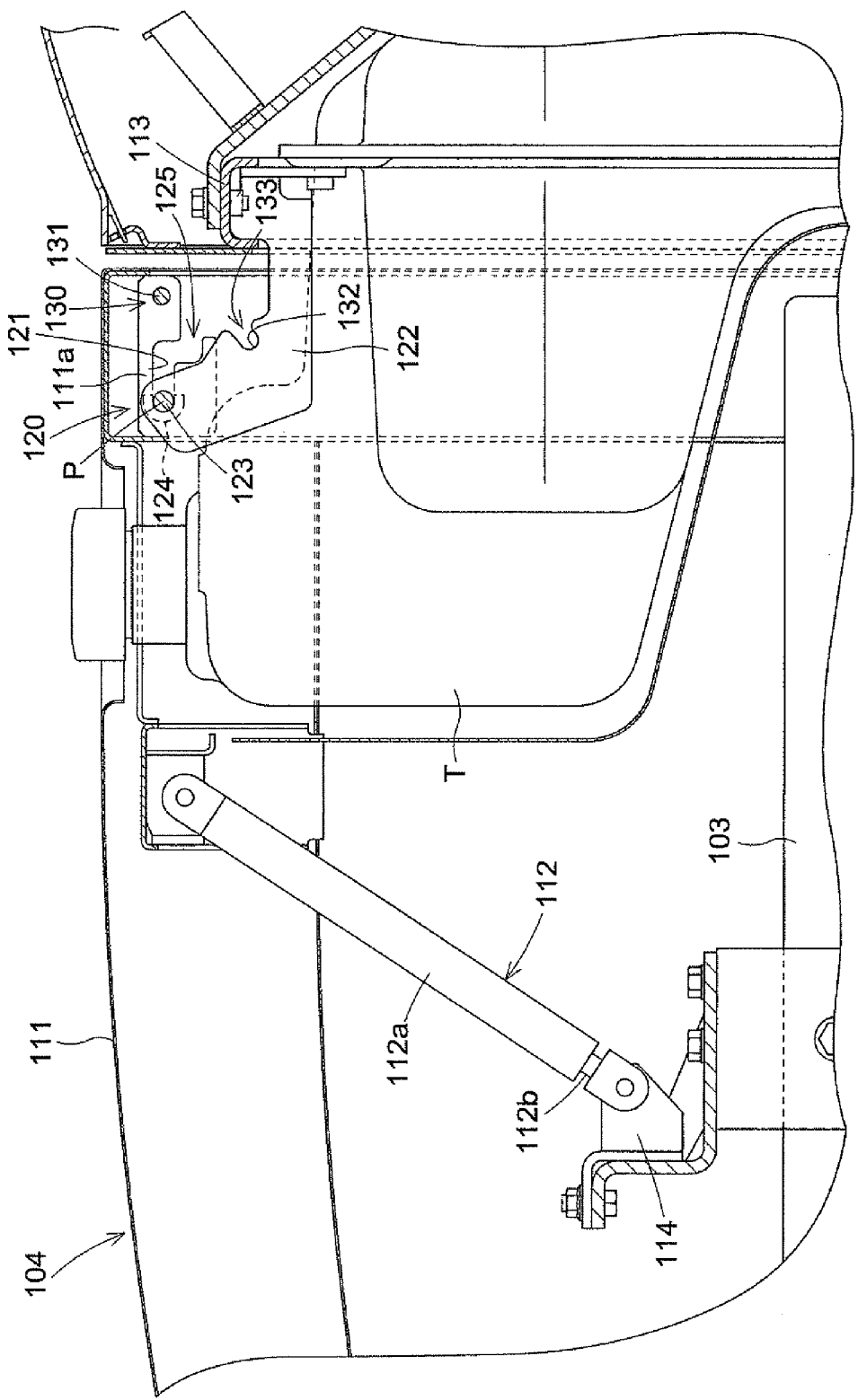
FIG. 9 is a longitudinal cross-sectional side view of a tractor according to another embodiment.

FIG. 9 is a longitudinal cross-sectional side view of the power plant 104. In addition to comprising the engine 103, the power plant 104 comprises a pair of left and right lateral side plates 110, 110, a hood 111, and a pair of left and right gas springs 112 each connected at one end to the interior of the hood 111.

The pair of left and right lateral side plates 110, 110 and the hood 111 form a power plant compartment for housing the engine 103 and an engine fuel tank T positioned behind the engine 103, the power plant compartment being formed above a front wheel support frame 107a constituting the front part of the vehicle body frame 107.

The pair of left and right lateral side plates 110, 110 are detachably supported on the front wheel support frame 107a and on a support frame 113 that is erected on the vehicle body frame 107 and that has a gate shape as seen in the longitudinal direction of the vehicle body.

The hood 111 is supported on the support frame 113 via a pair of left and right hood pivot mechanisms 120, 120 provided extending between the rear end of the hood 111 and the support frame 113.

Figure 10:
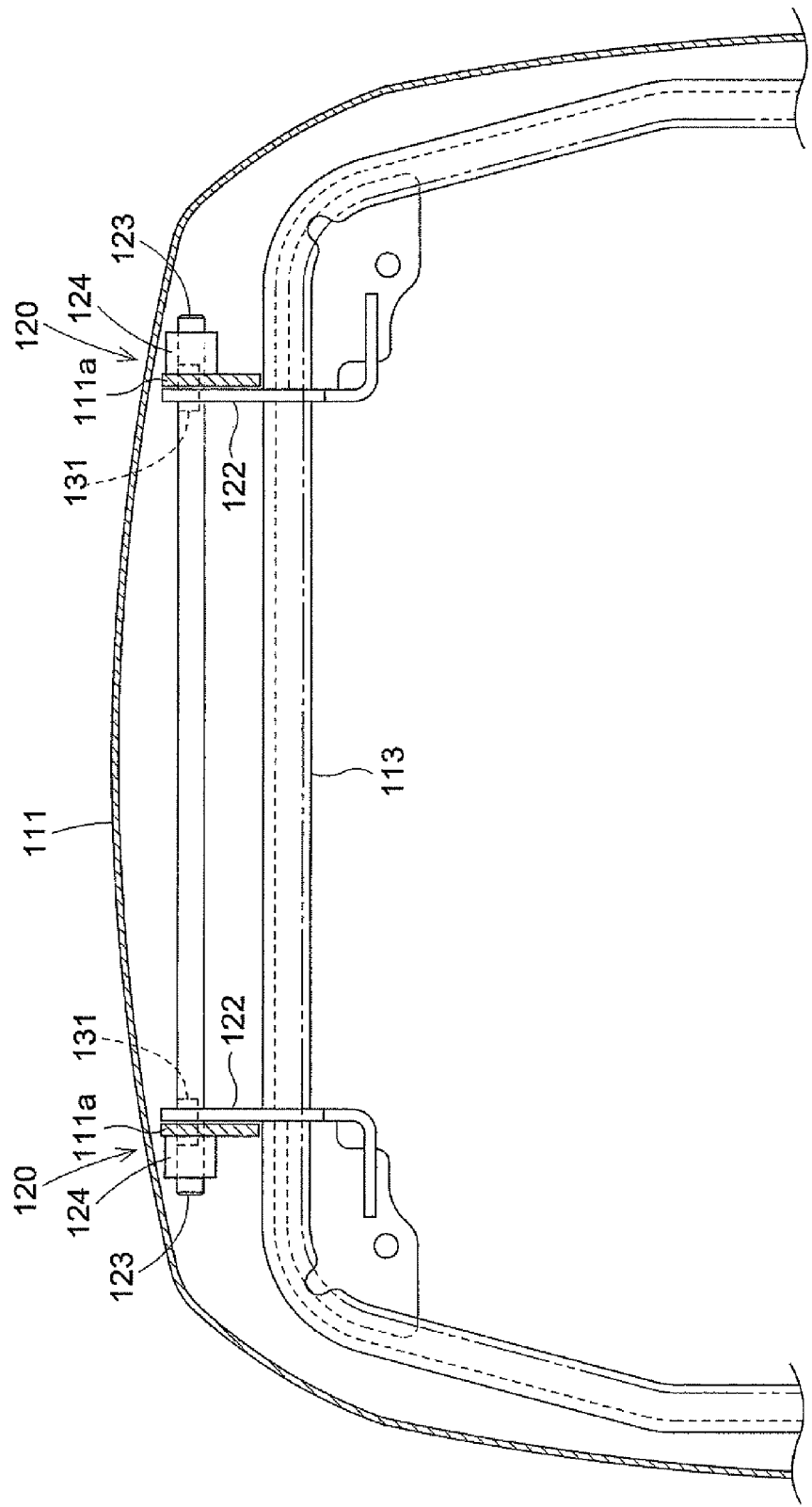
FIG. 10 is a front view of the hood pivot mechanisms.

FIG. 9 shows the structure of the hood pivot mechanisms 120 as seen from the side. FIG. 10 is a front view of the pair of left and right hood pivot mechanisms 120, 120. The hood pivot mechanisms 120 comprise connecting parts 111a provided by appending plate bodies to the rear end of the hood 111, oblong pivoting-pin holes 121 provided in the connecting parts 111a, hood support bodies 122 extending toward the front of the vehicle body from the support frame 113, and pivoting pins 123 configured so as to be rotatably and slidably inserted into the pivoting-pin holes 121 and provided to the hood support bodies 122, as shown in the drawings.

The connecting parts 111a of the hood pivot mechanisms 120 comprises block bodies 124 appended to one side surface of each connecting part 111a, and the connecting parts 111a are reinforced by the block bodies 124 so as to prevent deformation of the pivoting-pin holes 121 due to contact between the connecting parts 111a and the pivoting pins 123. The pivoting pin 123 of the left hood pivot mechanism 120 and the pivoting pin 123 of the right hood pivot mechanism 120 are configured by a single pin member.

Figure 11:
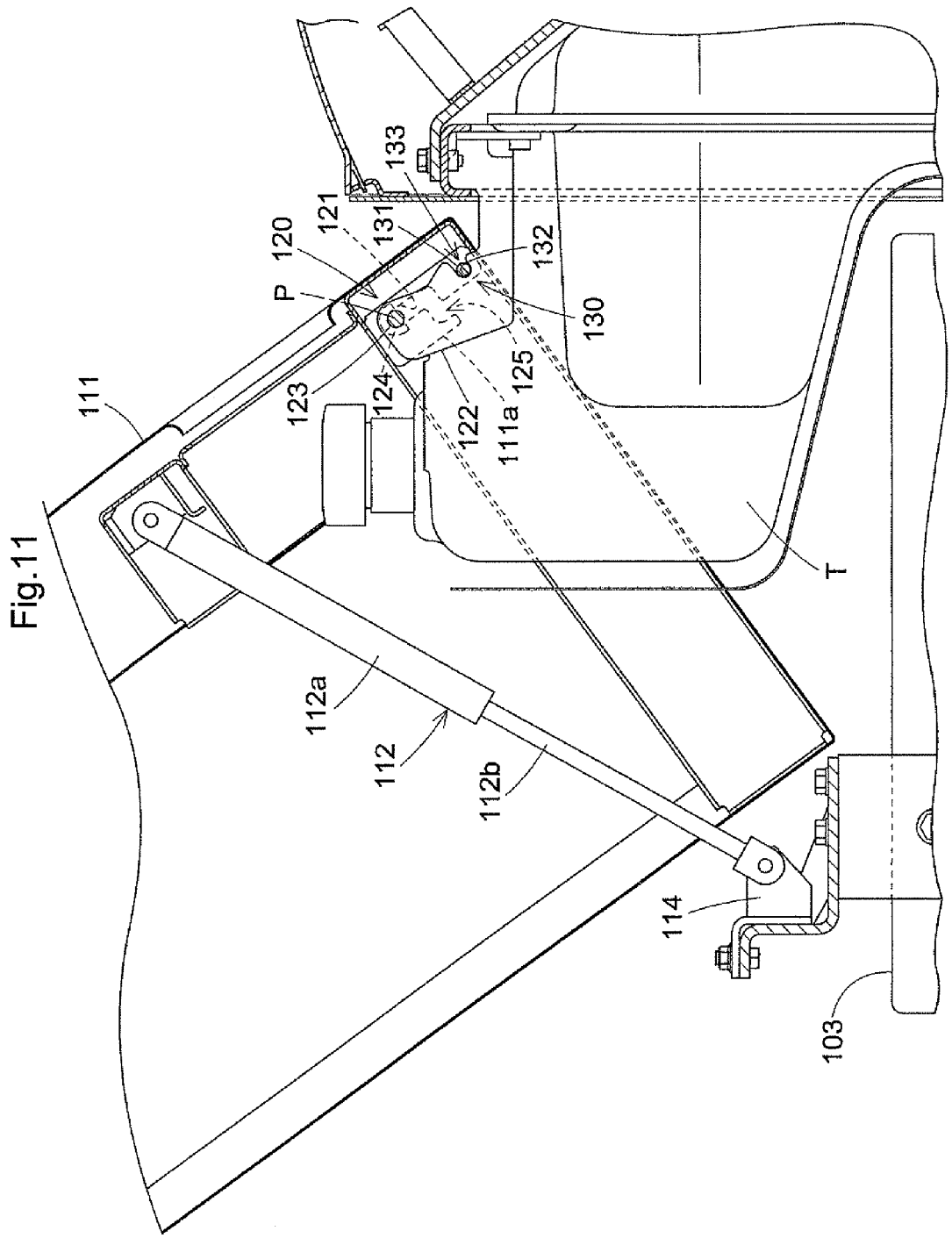
FIG. 11 is a side view of the upward raised position of the hood.

In other words, the hood 111 is pivoted by the pivoting pins 123 and the pivoting-pin holes 121 of the pair of left and right hood pivot mechanisms 120, 120, and the hood 111 swings up and down around an opening and closing axial center P, which is the axial center of the pivoting pins 123, and which is positioned at the rear end of the hood 111 and laterally oriented in relation to the vehicle body; between a raised open position shown by the double-dashed lines in FIG. 8 and shown by the solid lines in FIG. 11, and a lowered closed position shown by the solid lines in FIGS. 8 and 9.

The pair of left and right gas springs 112, 112 are configured comprising cylinder bodies 112a pivotably supported at one end on the hood 111, rods 112b slidably fitted at one end into the cylinder bodies 112a and supported at the other end on brackets 114, and gas sealed within the cylinder bodies 112a so as to urge the rods 112b out of the cylinder bodies 112a, wherein the hood 111 is urged to swing to the raised open position, as shown in FIG. 11. The brackets 114 are supported on the top part of the engine 103.

Figure 13:
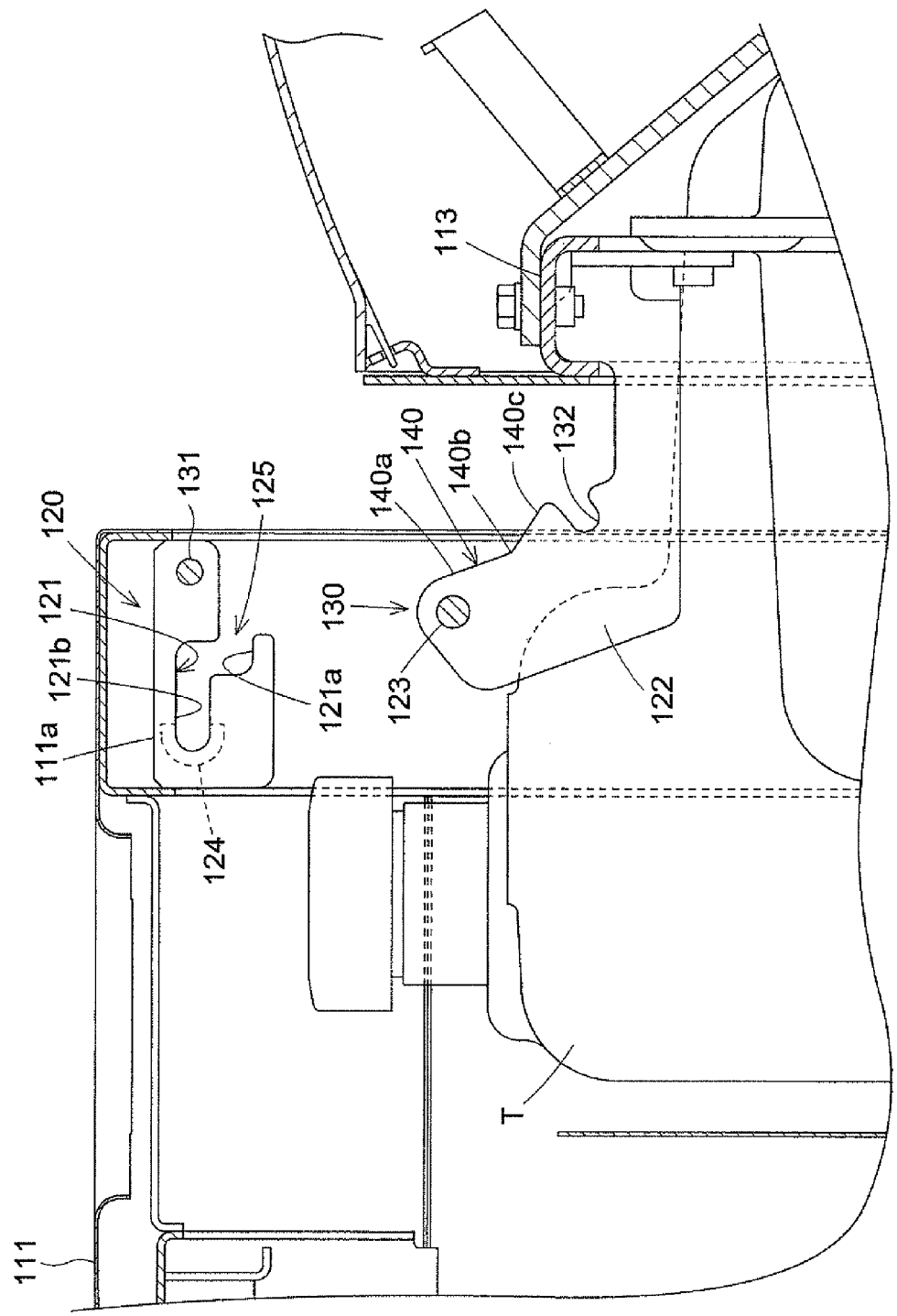
FIG. 13 is a side view of the hood pivot mechanisms in a state of the hood having been removed.

The pivoting-pin holes 121 of the pair of left and right hood pivot mechanisms 120, 120 are provided with openings 125 that open towards the rear of the hood at the rear end of the hood in the longitudinal direction, as shown in FIGS. 9 and 13. The pair of left and right hood pivot mechanisms 120, 120 are provided with hood support means 130 having support pins 131 provided to the connecting parts 111a of the hood 111.

In addition to the comprising the support pins 131, the hood support means 130 of the hood pivot mechanisms 120 are configured comprising support pin holes 132 provided to the hood support bodies 122, and openings 133 provided to the support pin holes 132 so as to open upward and to the rear in relation to the vehicle body.

FIG. 11 shows a side view of the structure of the operating state of the hood support means 130. When the hood 111 goes into the upward raised position, the support pins 131 are accordingly inserted into the support pin holes 132 through the openings 133, and the hood support means 130 switch to the operating state. The hood support means 130 thereupon operate while supported by the hood support bodies 122 on the connecting parts 111a via the support pins 131, and the pivoting pins 123 are thereby positioned at the ends on the opposite sides of the positions of the openings 125 of the pivoting-pin holes 121, whereby the hood 111 is supported in the raised open position and is unable to detach from the pivoting-pin holes 121 of the pivoting pins 123, and the hood 111 is supported in the raised open position.

FIG. 9 shows a side view of the structure of the operation-released state of the hood support means 130. When the hood 111 is operated to lower from the raised open position, the support pins 131 accordingly come out of the openings 133 of the support pin holes 132, as shown in the drawing. The hood support means 130 thereupon switch to the operation-released state, enabling the hood 111 to swing downward.

In other words, the hood 111 is operated to swing upward around the opening and closing axial center P in order to open the engine compartment, as shown in FIG. 11. At this time, a gentle raising operation can be performed by the upward urging of the hood 111 by the pair of left and right gas springs 112, 112. When the support pins 131 are inserted into the support pin holes 132 along with the raising of the hood 111, the hood 111 reaches the raised open position and the engine compartment opens farther upward and forward than the lateral side plates 110. At this time, the hood support means 130 are switched to the operating state by the insertion of the support pins 131 into the support pin holes 132, and the hood 111 is supported by the hood support means 130 so that wobbling does not occur as a result of the oblong shape of the pivoting-pin holes 121, regardless of the upward urging by the gas springs 112.

The hood 111 is operated to swing downward around the opening and closing axial center P in order to close the engine compartment, as shown in FIG. 9. The support pins 131 thereupon detach from the support pin holes 132, the hood support means 130 switch to the operation-released state, and the hood 111 lowers. When the rear end of the hood 111 lies along the lateral side plates 110, the hood 111 reaches the lowered closed position and the engine compartment is closed.

Figure 12:
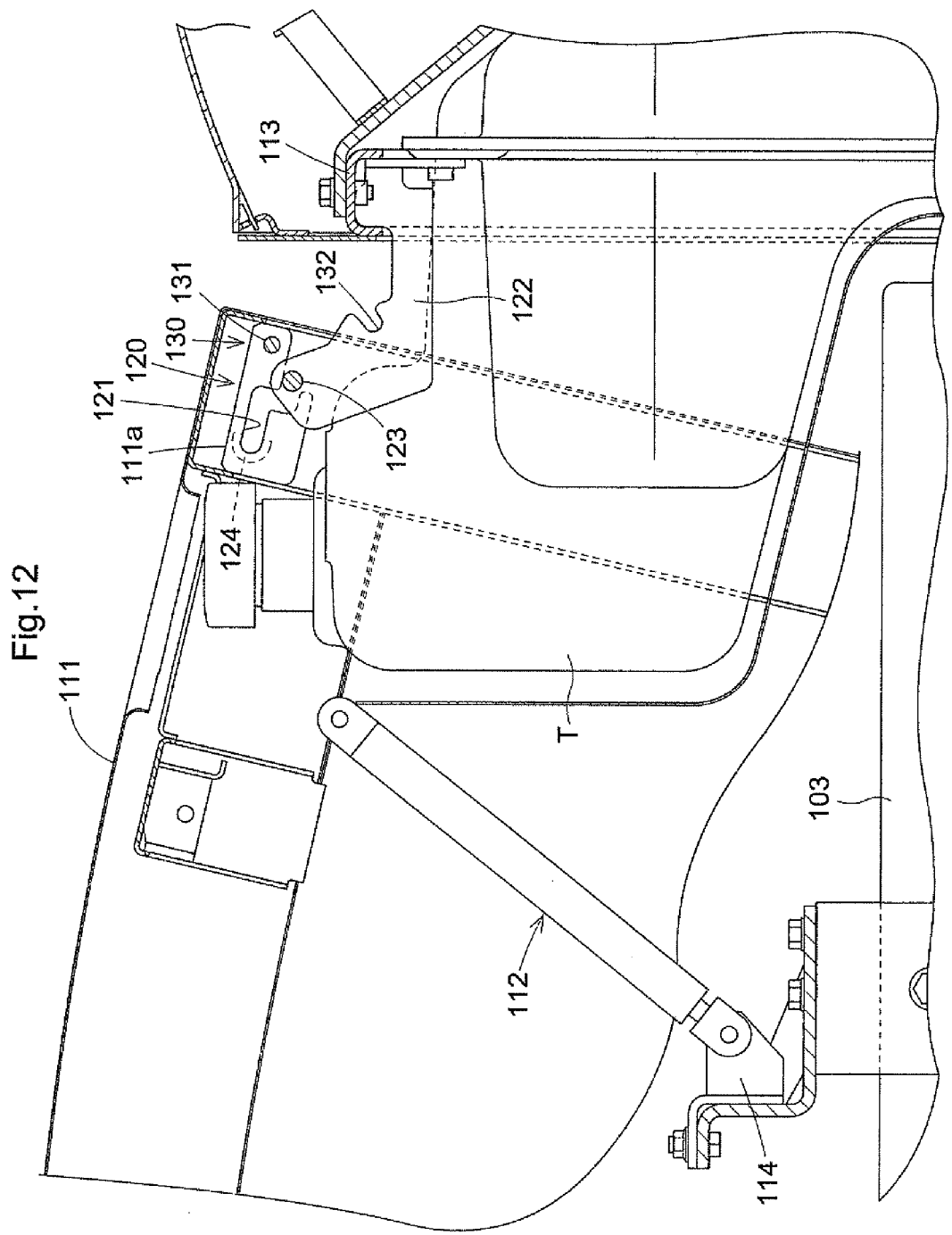
FIG. 12 is a side view of the hood pivot mechanisms in the process of removing the hood.

FIG. 12 is a side view of the hood pivot mechanisms 120 in the process of removing the hood. FIG. 13 is a side view of the hood pivot mechanisms 120 in a state of the hood having been removed. When the hood 111 is operated to Swing down from the raised open position, the support pins 131 detach from the support pin holes 132, the hood support means 130 switches to the operation-released state, and the hood 111 is then pulled toward the front of the vehicle body, as shown in the drawings. The connecting parts 111a of the hood 111 thereupon move toward the front of the vehicle body in relation to the hood support bodies 122, the pivoting pins 123 of the pair of left and right hood pivot mechanisms 120, 120 detach from the pivoting-pin holes 121, and the hood 111 separates from the pair of left and right hood support bodies 122, 122.

The pivoting-pin holes 121 of the pair of left and right hood pivot mechanisms 120, 120 are configured as bent oblong holes that are bent between lead-in parts 121a, which have the openings 125r and internal parts 121b, which are positioned on the opposite side from the openings 125. The hood support bodies 122 of the pair of left and right hood pivot mechanisms 120, 120 are provided with mounting guides 140 disposed farther upward in relation to the vehicle body than the support pin holes 132.

Figure 14:
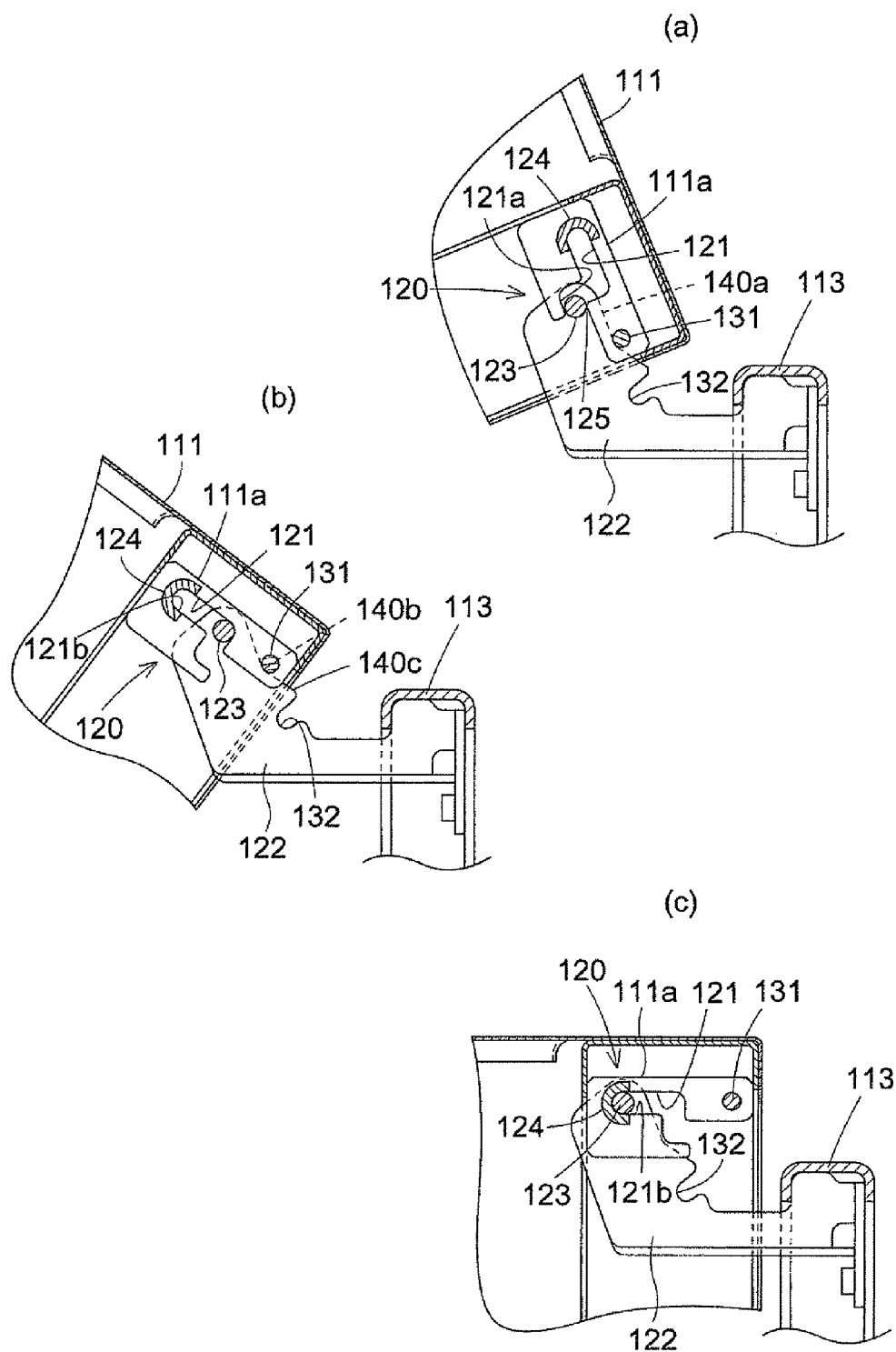
FIG. 14 includes side views showing how the hood is mounted.

FIGS. 14A, 14B, and 14C are side views showing the area where the hood 111 is mounted. When the support pins 131 are slid downward into lead-in side parts 140a of the mounting guides 140, the guiding action of the lead-in side parts 140a causes the pivoting pins 123 to enter the lead-in parts 121a of the pivoting-pin holes 121 through the openings 125, as shown in the drawings. When the support pins 131 reach intermediate parts 140b of the mounting guides 140, the hood 111 is swung slightly downward around the axial center of the support pins 131, the pivoting pins 123 are thereby moved to the entrance of the internal parts 121b of the pivoting-pin holes 121, and the support pins 131 thereupon slide downward into terminal lateral parts 140c of the mounting guides 140. The guiding action of the terminal lateral parts 140c thereupon causes the pivoting pins 123 to enter all the way into the internal parts 121b of the pivoting-pin holes 121, and the hood 111 can be supported on the pair of left and right hood support bodies 122.

Instead of the gas springs 112 of the embodiment described above, upward-urging mechanisms may also be used that have a configuration that uses bendable links connected to the hood 111, and winding springs for urging the bendable links to extend. Therefore, the gas springs 112, the upward-urging mechanisms, and the like are collectively referred to as urging means 112.

Instead of the embodiments described above, a configuration may be used and carried out in which support pins are provided to hood support bodies and support pin holes are provided to the hood. The objects of the present invention can be achieved in this case as well

What is claimed is:

1. A tractor comprising:
   a vehicle body frame;
   a support frame having a gate shape as seen in a longitudinal direction of the vehicle body such that a cross frame portion is provided at a top end portion thereof, wherein the support frame is erected on the vehicle body frame and the support frame supports a hood;
   a steering wheel;
   a steering column, wherein the steering column is erected on the vehicle body frame and the steering column supports the steering wheel;
   a connecting member, wherein the connecting member is connected at one end to the support frame and directly connected at the other end to the steering column;
   an instrument panel supporting device erected on the connecting member;
   an instrument panel, wherein the instrument panel is mounted on the connecting member with the instrument panel supporting device supporting the instrument panel from under; and
   an operation panel, wherein the operation panel is provided below the steering wheel and the operation panel has a display window at a position facing the instrument panel.

2. The tractor according to claim 1, wherein the connecting member includes a pair of right and left connecting member main bodies respectively comprised of a pair of right and left plates for connecting the cross frame portion of the support frame with the steering column and a pair of fore and aft connecting rods, each of the connecting rods being connected between the right and left connecting member main bodies; and wherein the instrument panel supporting device stands erect at each of opposed ends of each of the fore and aft connecting rods.

3. The tractor according to claim 1, wherein the connecting member is provided with a panel support part for fastening and connecting a part of the operation panel in the vicinity of the display window.

4. The tractor according to claim 1, wherein a display surface of the instrument panel has a curved surface in which the center in the vertical direction of the instrument panel is concaved inward as seen from the side of the vehicle body.

5. A tractor comprising:
   a hood, wherein the hood is capable of swinging up and down between a raised open position and a lowered closed position;
   hood support bodies;
   pivoting pins, wherein the pivoting pins are provided to either one of the hood or the hood support bodies;
   pivoting-pin holes, wherein the pivoting-pin holes are provided to the other one of the hood or the hood support bodies and the pivoting-pin holes have openings for engaging and releasing the pivoting pins;
   support pins, wherein the support pins are provided to the hood; and
   support pin holes, wherein the support pin holes are provided to the hood support bodies and the support pin holes have openings for engaging and releasing the support pins; wherein the support pin holes and either the pivoting pins or the pivoting-pin holes are provided on a same component that forms each of the hood support bodies;
   wherein the hood is pivotably supported on the hood support bodies by the pivoting pins and the pivoting-pin holes; and
   wherein the support pins are engaged with the support pin holes in the raised open position, thereby preventing the pivoting pins from detaching from the pivoting-pin holes, and the engagement between the support pins and the support pin holes is released in the lowered closed position, thereby allowing the pivoting pins to detach from the pivoting-pin holes.

6. The tractor according to claim 5, further comprising guides that are provided to be continuous with the openings of the support pin holes and that guide the engaging and disengaging of the support pins.

7. The tractor according to claim 5, further comprising urging members for urging the hood to swing to the raised open position.

* * * * *